(12) United States Patent
Miller et al.

(10) Patent No.: US 12,130,809 B2
(45) Date of Patent: Oct. 29, 2024

(54) DEEP NAVIGATION VIA A MULTIMODAL VECTOR MODEL

(71) Applicant: eBay Inc., San Jose, CA (US)

(72) Inventors: Christopher Miller, San Jose, CA (US); Shubhangi Tandon, San Jose, CA (US); SenthilKumar Gopal, San Jose, CA (US); Selcuk Kopru, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/947,971

(22) Filed: Sep. 19, 2022

(65) Prior Publication Data

US 2024/0095242 A1 Mar. 21, 2024

(51) Int. Cl.
G06F 16/2453 (2019.01)
G06F 16/248 (2019.01)

(52) U.S. Cl.
CPC ...... *G06F 16/24534* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 6,460,029 B1 | 10/2002 | Fries | |
| 8,332,393 B2 | 12/2012 | Elyada | |
| 9,015,143 B1 | 4/2015 | Sahin | |
| 9,092,523 B2 | 7/2015 | Tanne | |
| 9,110,993 B1 | 8/2015 | Shattuck | |
| 9,342,567 B2 | 5/2016 | Blackwell | |
| 9,824,117 B1 | 11/2017 | Adogla | |
| 9,858,314 B2 | 1/2018 | Bhatt | |
| 10,706,450 B1 | 7/2020 | Tavernier | |
| 11,055,305 B1 | 7/2021 | Petricek | |
| 2008/0212899 A1* | 9/2008 | Gokturk | G06F 16/5854 382/305 |
| 2016/0179908 A1* | 6/2016 | Johnston | G06F 16/9537 707/724 |
| 2019/0163768 A1 | 5/2019 | Gulati et al. | |

(Continued)

OTHER PUBLICATIONS

Barry G. Silverman et al, "Do what I mean: online shopping with a natural language search agent", Jul. 2001, https://repository.upenn.edu/cgi/viewcontent.cgi?article=1044&context=ese_papers.

(Continued)

*Primary Examiner* — Kannan Shanmugasundaram
(74) *Attorney, Agent, or Firm* — Shook, Hardy & Bacon L.L.P.

(57) ABSTRACT

A multimodal embedding modifier generates a modified seed search selection embedding for providing a set of search results. The multimodal embedding modifier enhances the ability and accuracy of identifying a user's true intent when searching the online marketplace. For example, embodiments disclosed herein can allow a user to navigate multiple modalities for an item. In some embodiments, a user may select a search result corresponding to an initial search query, and further modify the selected search result by inputting a modifier (e.g., a textual modifier). The multimodal embedding modifier can be trained using a training dataset including a text embedding, an image embedding, another type of embedding, or a combination thereof.

20 Claims, 8 Drawing Sheets

(56) References Cited

U.S. PATENT DOCUMENTS

2019/0294702 A1    9/2019  Wu et al.
2021/0073252 A1*   3/2021  Guo ..................... G06F 16/383
2021/0224876 A1    7/2021  Kale

OTHER PUBLICATIONS

Hassan Sajjad et al, "Underspecified Query Refinement via Natural Language Question Generation", Dec. 2012, https://aclanthology.org/C12-1143.pdf.

Emily Hill et al, "NL-based Query Refinement and Contextualized Code Search Results: A User Study", Feb. 2014, https://users.drew.edu/~ehill1/papers/CSMR-WCRE14.pdf.

Belinda Zeng, "Go beyond the search box: Introducing multisearch (blog.google)", Apr. 7, 2022, https://blog.google/products/search/multisearch/.

Tonya Garcia, "Google Lens feature adds text to make online shopping more specific—MarketWatch", Apr. 7, 2022, https://apple.news/AjNyG0zN0TT6e4QG-qNSU4Q.

European search report received for European Application No. 23197896.6, mailed on Jan. 24, 2024, 7 pages.

* cited by examiner

DEEP NAVIGATION VIA A MULTIMODAL VECTOR MODEL

BACKGROUND

Search systems provide a useful tool for locating item listings or documents. For example, an item listing or document may be identified by a search engine in response to receiving a search query. Various search systems can provide modified search results based on receiving one or more selections of a predetermined filter (e.g., provided via a drop-down list of filter options). A second way to modify search results is to re-query using a different search query and providing a new set of search results. By using only these two approaches, a user's ability to locate search results closely tailored to the user's intent is constrained, among other limitations.

SUMMARY

At a high level, aspects described herein relate to providing search results that reflect a user's intent. For example, a search engine may receive a search query and provide a first set of search results based on the query. Additionally, a seed search selection of one or more of the first set of search results may be received, as well as one or more modifiers. As an example, a user may select an image associated with the first set of search results, and the user may also provide a natural language input modifier. As another example, the user may select an item listing associated with the first set of search results, and the user may also provide a negative modifier, a positive modifier, modifiers with varying weightages and applicability, another type of modifier, or a combination thereof.

Further, a modifier embedding may be determined for the modifier received. The modifier embedding is used to modify a seed search selection embedding of the seed search selection received. The modified seed search selection embedding is an enhanced embedding that more closely reflects the intent of the user. For example, the modified seed search selection embedding can provide greater insight to relevant features in a vector space, which provides enhanced determinations of item listings within a distance or range of the modified seed search selection embedding for providing search results to a computing device.

An "embedding" or an embedding value (sometimes called a vector), for example, may correspond to a representation of an aspect or category of an item (such as a good or service, for example) in the vector space. In some embodiments, the modifier embedding may be determined as a result of convolutions of one or more item informational attributes, such as a title, an image, a facet, a description, or a combination thereof, for example. As an example, the modifier embedding, the seed search selection embedding, or both, may be output by a deep neural network. As another example, one or more seed search selection embeddings may be generated from one or more of textual item listing data (e.g., a title), image item listing data, metadata (e.g., metadata corresponding to an image, audio, video, data type, other metadata, or a combination thereof), other seed embedding data, or a combination thereof.

As an example, some embodiments of modifying the seed search selection embedding may include combining the seed search selection embedding with a positive modifier embedding corresponding to the modifier received. As another example, modifying the seed search selection embedding may include removing a negative modifier embedding from the seed search selection embedding. In yet another example, modifying the seed search selection embedding may include combining at least a portion of the seed embedding (e.g., a portion corresponding to an image embedding for a seed search selection embedding comprising both an image and text embedding) and a positive modifier embedding and removing a negative modifier embedding from at least another portion of the seed search selection embedding. Further, the modification may include combining a least a portion of the seed embedding and positive modifier embedding and subsequently removing the negative modifier embedding, or vice versa. As another example, the seed search selection embedding can be modified using various scaling and/or weighting techniques to the positive modifier embedding and/or the negative modifier embedding.

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
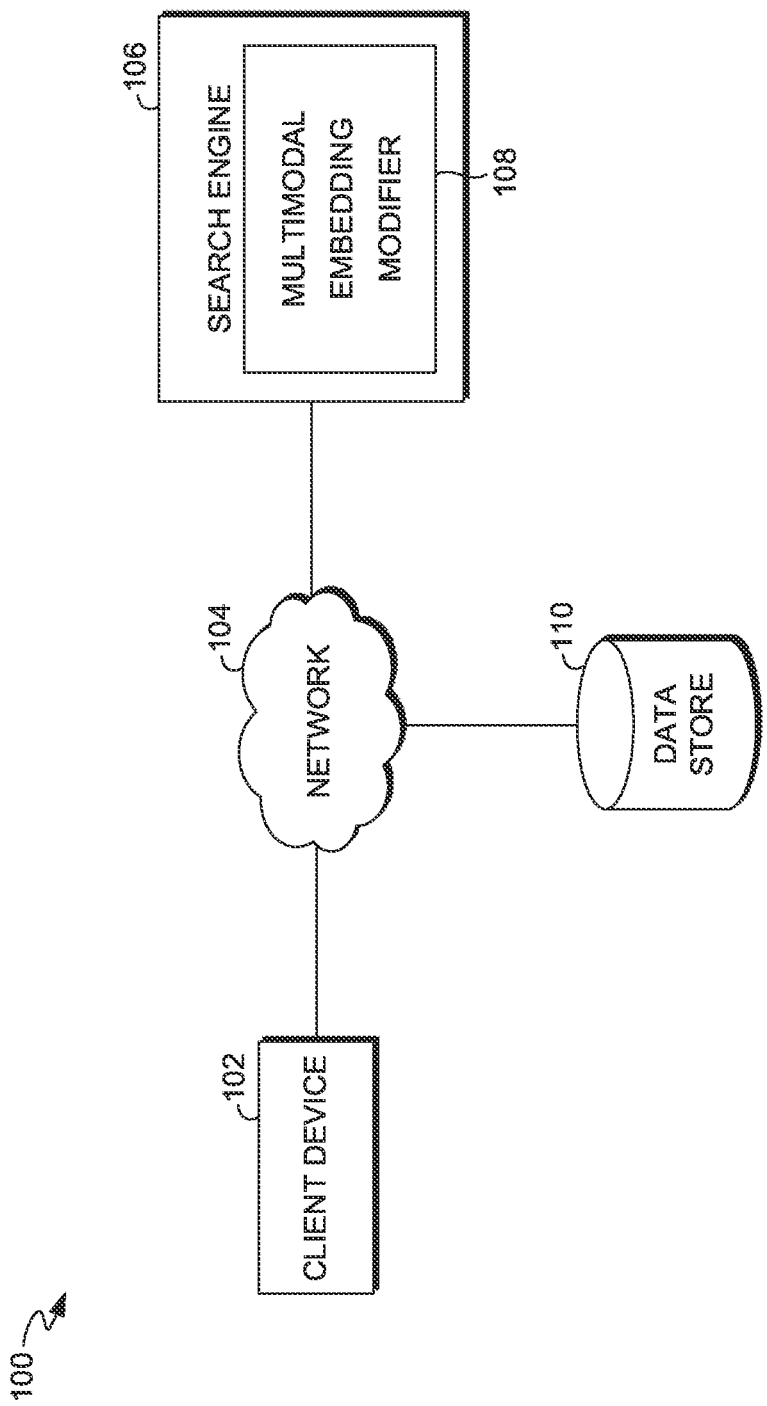
FIG. 1 is a block diagram of an example operating environment suitable for employing a multimodal embedding modifier, in accordance with an embodiment described herein.

Search engines typically navigate to more precise search results based on an initial search in one of two ways: by narrowing the initial set of search results to a subset of results using a predetermined filter or by receiving a second search query and generating a new set of search results based on the second search query. These two existing search methods limit a user's ability to receive search results that are more closely tailored to the user's intent. In addition, these two existing search methods do not permit a user to identify other related items that a user would also be interested in purchasing.

Unlike these two existing search methods, the technology disclosed herein allows users to navigate through multiple modalities to identify search results more closely related to the user's intent. For example, related items may be identified using a modifier (e.g., a free-text input or audio input) that does not restrict users to predefined filters that solely, and linearly, narrow a first set of search results further. The technology disclosed herein allows users to navigate search results by modifying searches via various modalities for an item (e.g., by pivoting the search based on the title, description, other metadata attributes, and/or the image of one or more search results). In embodiments, search results may be modified to exclude an item attribute, to include an additional item attribute, to amplify a quality of an item, to aggregate an attribute across multiple items (e.g., red leather for couches and sectionals), and to identify different items with a similar attribute (e.g., posters and pillows having the same pattern).

To "pivot" the search, a user can receive a first set of search results based on a search query. A seed from the search results can be selected (e.g., the user selects an item listing, an item image, a portion of an item description of the item listing), which is related to the intent of user. In addition, one or more modifiers are received (e.g., the user inputs the free-text modifier). Based on the seed selected and the one or more modifiers, a vector embedding for the selected seed search result is modified using a vector embedding for the modifier. As such, a second set of search results are provided based on the modified seed search selection embedding.

One shortcoming of using only the two existing search methods described above, which limit the user's ability to receive search results closely tailored to the user's intent, includes adversely affected computer network communications. For example, each time an additional filter is applied or each time a completely new search is conducted, associated contents or payload (e.g., payload associated with metadata from the refinement) can be multiplied due to the additional processing needed to analyze an associated catalog for items corresponding to the one or more filter options or items for a completely new search. Throughput and latency can result from this additional processing and associated metadata being transmitted over the network. In some instances, having certain predetermined filters can increase storage device I/O (e.g., excess physical read/write head movements on non-volatile disk) when items within a catalog are incorrectly or inaccurately labeled, since unnecessary information is being stored and processed. In doing so, a computing system often has to reach out to the storage device to perform a read or write operation, which is time consuming, error prone, and can eventually wear on components, such as a read/write head.

Furthermore, some prior system architectures include machine learning models that have not been trained on particular features within an item listing of a catalog or not trained on a combination of features of the item listing. For example, the prior systems may only be trained on identifying whether or not a seller-provided description of a good or service listed on the market includes or does not include a particular term (such as whether or not the term "book" is within the description). More specifically, the prior system architectures are not trained on particular textual embeddings; and the prior systems do not generate any particular modified embeddings from the seller descriptions of the good or service. In addition, some prior system architectures do not use any images (e.g., seller-provided images) for training; nor do they use both image embeddings and textual embeddings for training. As a result, these prior systems might mischaracterize an item or identify an inaccurate item for a search query.

As such, it is a goal of some online marketplaces to more accurately identify and determine item listings of goods or services, for example, mostly closely aligning with a true intent of a user. Accordingly, it is beneficial to provide a system that rapidly identifies these items and associated item listings. It is also beneficial to provide a system that can respond and adapt to changes in the online marketplace, such as new items and new item listings that may be continuously introduced. While reference may be made to an online marketplace utilizing the disclosed technology to identify and retrieve items and item listings, it will be understood that the technology may be used in the more general context of an online search engine identifying and retrieving objects from an index and returning them to a computing device as search results.

The technology described by this disclosure achieves these goals and provides a solution to the problems specific to online marketplaces and search engines discussed above. For example, in embodiments of the present disclosure, a process begins by receiving a search query at a search engine. The search query is input into a multimodal machine learning model that determines a search query embedding in the vector space. In some embodiments, the search query is input into a search engine that generates search results based on the search query. A search result is identified as having a feature or attribute that is more relevant to the user's intent, and as such, is selected. The search result is then used as a seed, e.g., a starting point for updating the search results to more closely align with the user's intent.

The search engine also receives a modifier. A modifier, for example, may include a positive modifier (e.g., the search query could include the phrase "burnt orange hand towel" and two positive modifiers could include "Turkish" and "handmade" to pivot the search results toward burnt orange hand towels that are both Turkish and handmade). A modifier may also include a negative modifier (e.g., for the "burnt orange hand towel" search query, a negative modifier could include "purple" to pivot the search results away from burnt orange hand towels that also include the color purple). In some embodiments, the positive modifier is a keyword to be included within a title of item listings and the negative modifier is a keyword to be excluded from the title. In other embodiments, a modifier may be associated with an image of the item listings or a particular portion of a textual description of each item within the item listings. In some embodiments, a modifier may include one or more characters or words entered by a user or an audio input provided by a user. Further, some modifiers may be weighted more heavily than others (e.g., based on user-provided weights or weights determined by a search engine corresponding to the multimodal machine learning model).

The modifier generally identifies an attribute that is more or less desirable based on the seed that has been selected. For instance, a search result for "couch" may return a variety of couches. Continuing the example, a "sectional couch" could be selected from the search results as the seed because its shape is closer to the user's intent. The modifier may include "no leather" and "red," in an effort to identify non-leather red sectionals.

To do this, the modifier is input to the multimodal model that then outputs a modifier embedding, which can be used to modify the seed search embedding by moving in a vector space direction away from negative modifiers (e.g., "no leather") and toward positive modifiers (e.g., "red") to identify a modified seed search embedding. Item listings can then be identified using the seed search embedding, and those item listings can be output as a second set of search results by the search engine, which are more likely to correspond to the user's intent (e.g., red sectional couches that are not leather).

In addition, the present disclosure generally describes a system for generating a modified seed search selection embedding corresponding to an item (such as a good or service, for example). The corresponding item may have an item listing including a title, one or more images, metadata, other item listing data, or a combination thereof. Search results are provided based on the modified seed search selection embedding. The modification to the seed search selection embedding may, for example, correspond to a positive modifier embedding and/or a negative modifier embedding, in some embodiments.

For example, a multimodal model may be trained to generate an image embedding, a text embedding, or a combination thereof. In embodiments, the multimodal model can simultaneously produce image and text embeddings. The multimodal model may, for example, be trained using a plurality of titles from a plurality of item listings. As another example, the multimodal model can be trained to minimize matching loss between text and an image corresponding to the same item. In yet another example, the multimodal model can also minimize matching loss between or among text and an image, audio, or video. As such, by generating a modified seed search selection embedding using vector modification, the multimodal model provides for improved inventory navigation. For example, the improved inventory navigation may result in identifying items that do not include a particular quality identifier, identifying items that do include the particular quality identifier, amplifying a particular search based on the particular quality identifier, aggregating a particular quality identifier multiple times across a plurality of dimensions, or a combination thereof.

To illustrate, if a user has entered an initial search query, and the first set of results for that search query include posters having a particular pattern. As the user is moving through the first set of results, the user may realize that the user now wants a pillow having that particular pattern. By using the technology disclosed herein, the user is able to navigate the search to pillows having the particular pattern without having to enter in an entirely new search query, and without selecting a predetermined filter. As such, by training the multimodal model to simultaneously produce image and text embeddings (as well as video and/or audio embeddings, in some embodiments) and to minimize match loss between text and image(s) corresponding to the same item, the technology disclosed herein provides a faster, more accurate, and more computationally efficient method compared to existing modeling methods. For instance, the technology disclosed herein provides a faster and more computationally efficient method compared to the existing methods that increase the contents or payload based on running excessive search queries and adding and saving multiple predetermined filters.

Having provided some example scenarios, a technology suitable for performing these examples is described in more detail with reference to the drawings. It will be understood that additional systems and methods for providing the improved inventory navigation can be derived from the following description of the technology.

Turning now to FIG. 1, FIG. 1 illustrates a block diagram of example operating environment 100 in which implementations of the present disclosure may be employed. In particular, FIG. 1 illustrates a high-level architecture of operating environment 100 having components in accordance with implementations of the present disclosure. The components and architecture of FIG. 1 are intended as examples, as noted toward the end of the Detailed Description.

Among other components or engines not shown, operating environment 100 includes client device 102. Client device 102 is shown communicating using network 104 to server 106 and data store 110. Server 106 is illustrated as hosting aspects of multimodal embedding modifier 108.

The client device 102 may be any type of computing device. One such example is computing device 800 described with reference to FIG. 8. Broadly, however, client device 102 can include computer-readable media storing computer-executable instructions executed by at least one computer processor. The client device 102 may be operated by a user, such as one or more of a person, machine, robot, other client device operator, or a combination thereof.

Client device 102 can interact with server 106 to employ aspects of the multimodal embedding modifier 108. Some example devices suitable for use as client device 102 include a personal computer (PC), a laptop computer, a mobile device, a smartphone, a tablet computer, a smart watch, a wearable computer, a personal digital assistant (PDA), a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

Client device 102 can employ computer-executable instructions of an application, which can be hosted in part or in whole at client device 102, or remote from client device 102. That is, the instructions can be embodied on one or more applications. An application is generally capable of facilitating the exchange of information between components of operating environment 100. The application may be embodied as a web application that runs in a web browser. This may be hosted at least partially on a server-side of operating environment 100. The application can comprise a dedicated application, such as an application having analytics functionality. In some cases, the application is integrated into the operating system (e.g., as a service or program). It is contemplated that "application" be interpreted broadly.

As illustrated, components or engines of operating environment 100, including client device 102, may communicate using network 104. Network 104 can include one or more networks (e.g., public network or virtual private network "VPN") as shown with network 104. Network 104 may include, without limitation, one or more local area networks (LANs) wide area networks (WANs), or any other communication network or method. Additionally, one or more portions of the network 104 may be an ad hoc network, an intranet, an extranet, a wireless LAN (WLAN), a wireless WAN (WWAN), a metropolitan area network (MAN), a portion of the Internet, a portion of the Public Switched Telephone Network (PSTN), a cellular telephone network, a wireless network, a Wi-Fi network, a WiMAX network, another type of network, or a combination thereof.

Server 106 generally supports the multimodal embedding modifier 108. Server 106 includes one or more processors, and one or more computer-readable media. One example server suitable for use is provided by aspects of computing device 800 of FIG. 8. Additionally, the computer-readable media includes computer-executable instructions executable by the one or more processors. The instructions may optionally implement one or more components of the multimodal embedding modifier 108, which will be described in additional detail below with reference to FIG. 2. In some embodiments, the sever 106 may comprise an application program interface server, a web server, and application server, for example. The application server can host one or more marketplace applications and one or more payment applications, for example. In some embodiments, server 106 may provide computing resources that are available as one or more bare metal resources or as one or more virtual machine instances, such as a rendition switching virtual machine (RSVM) instance, for example.

As with other components of FIG. 1, while server 106 is illustrated as a single server, it can include one or more servers, and various components of server 106 can be locally integrated within the one or more servers or may be distributed in nature.

Operating environment 100 is shown having data store 110. Data store 110 generally stores information including data, computer instructions (e.g., software program instructions, routines, or services), or models used in embodiments of the described technologies. Although depicted as a single component, data store 110 may be embodied as one or more data stores or may be in the cloud. One example of data store 110 includes memory 804 of FIG. 8. As another example, data store 110 may be coupled to an application server and may facilitate access to a plurality of data stores, such as a training database, an item listing database (e.g., including a text description of a relevant item and metadata categorizing the item), an image database, an index database (e.g., containing index data relating to images), or another type of database.

Having identified various components of operating environment 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are intended as examples in nature and in number and are not to be construed as limiting for all implementations of the present disclosure. Other arrangements and elements (e.g., machines, interfaces, functions, orders, and groupings of functions, etc.) can be used in addition to or instead of those shown, and some elements may be omitted altogether. Thus, it is reiterated that the operating environment 100 is but one example. In another example, functions of multimodal embedding modifier 108 are performed at client device 102, while in another example, one or more functions of t multimodal embedding modifier 108 are performed at client device 102 along with one or more functions being performed by server 106 in any combination. All such embodiments are intended to be within the scope of this disclosure.

Figure 2:
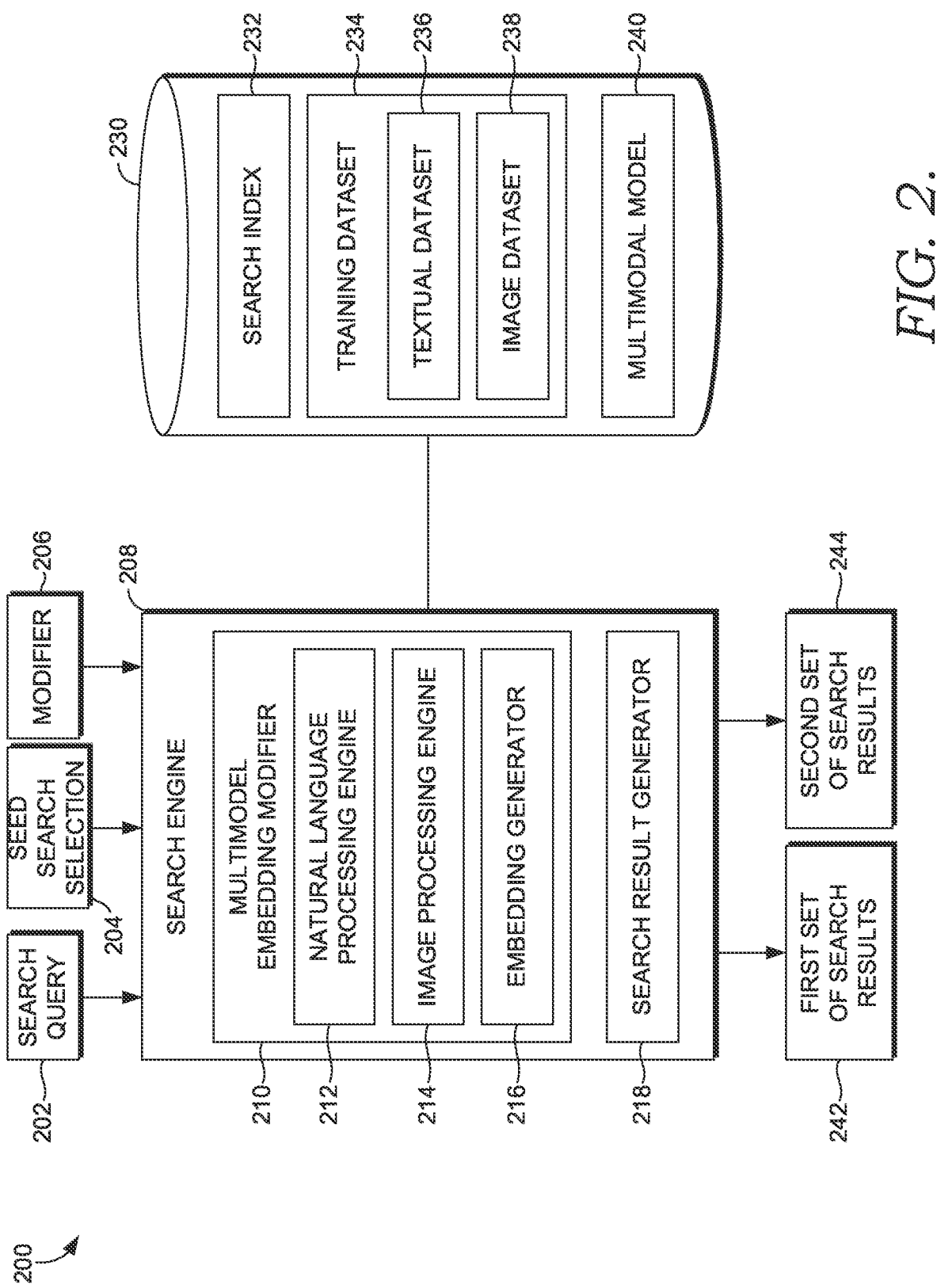
FIG. 2 is another example operating environment suitable for employing the multimodal embedding modifier, in accordance with an embodiment described herein.

With regard to FIG. 2, example environment 200 is provided for implementing the multimodal embedding modifier. For example, the multimodal embedding modifier 210 (e.g., such as the multimodal embedding modifier 108 of FIG. 1) of search engine 208 of environment 200 may include a natural language processing engine 212, an image processing engine 214, and an embedding generator 216. While illustrated in FIG. 2 as separate engines, in other embodiments, natural language processing engine 212 and image processing engine 214 are part of a single engine used to determine, generate, and modify an embedded vector representation of characters, a text string, an image, another form of data, or a combination thereof.

Many of the elements described in relation to FIG. 2 are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory.

As illustrated in FIG. 2, example environment 200 includes multimodal embedding modifier 210. At a high level, the multimodal embedding modifier 210 generates a modified seed search selection embedding for improved inventory navigation, the modification based on receiving an initial search query 202, a seed search selection 204, and one or more modifiers 206. To do so, multimodal model 240 is trained using a training dataset 234 (e.g., including a textual dataset 236, an image dataset 238, a video dataset, an audio dataset, another type of dataset, or a combination thereof), such that the multimodal model 240 can simultaneously produce image and text embeddings and minimize match loss between text and image(s) that correspond to the same item. While illustrated in FIG. 2 as separate datasets, in other embodiments, textual dataset 236 and image dataset 238 are part of a single dataset.

As illustrated in example environment 200, the multimodal embedding modifier 210 communicates with data store 230. Data store 230 is the type of data store described with respect to data store 110 of FIG. 1. Data store 230 is illustrated in example environment 200 as including search index 232, training dataset 234 including textual dataset 236 and image dataset 238, and multimodal model 240. The data illustrated within data store 230 is illustrated as an example. More or less data elements (e.g., only data elements 234, 236, 238, and 240, for example; or an additional data element not depicted), or one or more combinations of data elements thereof may be used by multimodal embedding modifier 210 in some embodiments. As an example, training dataset 234 may include an audio dataset and a video dataset in addition to the textual dataset 236 and the image dataset 238. In some embodiments, the data elements of data store 230 are distributed between or among a plurality of data stores, for example. The data elements shown in FIG. 2 have been provided to describe one example that can be implemented using the described technology.

Search engine 208 may receive a search query 202, such as a textual input into a query field, an image input into the query field, a video input into the query field, or an audio input into the query field, for example. In some embodiments, the search query includes unstructured text of one or more text strings (e.g., a text string having one or more n-grams). In general, any character string may be received by the search engine 208 for the search query 202. In some embodiments, search engine 208 receives a portion of a search query, such as a portion of a word or one word of a plurality of words, for example.

As an example, search engine 208 may provide a first set of search results based on the search query 202. In some embodiments, the search engine 208 may also receive a seed search selection 204 that was selected from the first set of search results, the first set of search results provided based on the search query 202. For example, a seed search selection 204 may correspond to a selection of an image of a plurality of images provided in response to receiving the search query 202. As another example, the seed search selection 204 may correspond to a selection of an item listing of a plurality of item listings provided in response to receiving the search query 202, wherein the item listing selected includes a textual description of an item for sale on the online marketplace. Continuing the example, the item may be tangible (e.g., a deck of cards), intangible (e.g., software), or something that has a distinct and separate existence from other things (e.g., a subscription to an audible book collection for a period of time). Further, the textual description of the item may include a condition of the item, one or more ratings of the item (e.g., ratings provided by an online marketplace user or buyer), a pattern on the item, an identifier for the item (e.g., a batch number, a catalog number, a serial number, a part number), a brand, a style, a size, a seller identifier (e.g., a unique identifier associated with a particular seller), a color, an available quantity, a price (e.g., list price, sale price, current auction price, current bid price), a number of the items previously sold, other suitable description information (e.g., other suitable description information related to sale, purchase, or user-interaction with the item listing), or a combination thereof.

Search engine 208 may also receive a modifier 206, such as a natural language or image input, for example. As an example, the modifier 206 may include a positive modifier, such as a keyword to be included within the title of item listings or a keyword corresponding to a title embedding or label of one or more item listings. As another example, the modifier 206 may include a negative modifier, such as a keyword to be excluded from the title of item listings or a keyword corresponding to a title embedding or label of one or more item listings. In other embodiments, the modifier 206 may be associated with an image of the item listings or a particular portion of a textual description of the item within the item listing. For example, the portion of the textual description may involve the condition of the item, an identifier for the item, the brand, the style, the size, the seller identifier, another type of description, or a combination thereof.

In some embodiments, each modifier (e.g., the positive modifier or the negative modifier) can be scaled or weighted. For example, in an embodiment associated with both a negative modifier and a positive modifier, the positive modifier may be weighted more heavily than the negative modifier. As another example, the number of positive modifiers may be greater than the number of negative modifiers. In yet another example, a modifier corresponding to the size of the item may be weighted more than a modifier corresponding to the seller identifier of the item. In some embodiments, the positive modifier is weighted based on a user-identified weight value.

In some embodiments, based on receiving the search query 202, the seed search selection 204, and the modifier 206, the multimodal embedding modifier 210 of search engine 208 can determine a seed search selection embedding for the seed search selection 204 and a modifier embedding for the modifier 206 via one or more of a natural language processing (NLP) engine 212, an image processing engine 214, or a combination thereof.

Beginning with NLP engine 212, a text embedding for language modeling and feature learning techniques can include mapping words or phrases to vectors of real numbers, for example. Through word embeddings, words or phrases associated with an item listing having semantic similarity to other item listings can become detectable by the NLP engine 212 when comparing vector representations. As such, an embedding determined by NLP engine 212 for the seed search selection 204 or the modifier 206 may correspond to a semantic representation of one or more data objects, such that the embedding represents a word, a phrase, a sentence, or other portions of textual content associated with both the search query and the user's true or ideal search intent. The representation may be a vector of real numbers, thereby providing various advantages over other approaches by improving dimensionality reduction and context similarities, for instance.

In some embodiments, NLP engine 212 may receive one or more text characters (e.g., a Latin alphabet letter or number, an Arabic alphabet letter or number, a Roman numeral, another symbol) or text strings comprising more than one text character, from the seed search selection 204, from an item listing associated with the seed search selection 204, or from the modifier 206. The NLP engine 212 may process the one or more text characters or the one or more text strings as needed, and store the processed one or more text characters or the processed one or more text strings (e.g., within the search index 232) in data store 230. The item listing associated with the seed search selection 204 may be received from an entity, such as a third-party seller, a consumer, one or more online marketplaces, a manufacturer, a retailer, a collector, an item expert, a website, another entity, or the like, or a combination thereof. In addition, the item listing associated with the seed search selection 204 may be stored within the search index 232, for example.

NLP engine 212 can be applied to process structured, semi-structured, or unstructured data of the received one or more text characters, the received text strings, or a combination thereof. Structured data includes data that is organized in some scheme that allows the data to be easily exported and indexed as data stored in the search index 232. Structured data can generally be collected and rearranged to comport to the index of item data within the search index 232. Unstructured data is not organized in a pre-defined manner and may include text, dates, numbers, facts, and so-forth. Unstructured data may sometimes require additional processing (compared to the processing of structured data) to store it in a computer-useable format within the search index 232. Semi-structured data does not conform to a data model but has some structure (e.g., more structure than the unstructured data) or some organizational properties. In some embodiments, structured, semi-structured, or unstructured item data, can include an online conversation, stored chatbot information, a manufacture's specification, item inspection notes, expert opinions, item packaging, general communications, books, articles, presentations, another medium through which information is conveyed, or a combination thereof.

To process the textual data received by search engine 208, NLP engine 212 is generally applied to the textual data of the seed search selection 204, from an item listing associated with the seed search selection 204, or from the modifier 206. In some embodiments, for audio and video data, a speech-to-text software can be employed to convert audio and video data into textual data for further processing by the NLP engine 212. One example of a speech-to-text software that is suitable for use with the current technology is Microsoft's Azure Speech to Text. Other speech-to-text software may also be suitable for use.

In addition, image processing engine 214 can receive one or more images, one or more image embeddings, or a combination thereof, from the seed search selection 204, from an item listing associated with the seed search selection 204, or from the modifier 206. The image processing engine 214 may process the one or more received images, the one or more received image embeddings, or the combination thereof as needed, and also store them in data store 230. For example, the image processing engine 214 can implement a neural network trained via the training dataset 234 to output one or more image embeddings associated with items and item listings. To illustrate, the neural network can be trained to learn image embeddings associated with various item features, such as a pink striped car exterior or a blue polka dot desk chair, for example. The image embeddings and the text embeddings output by multimodal model 240 can be associated with a spatial representation, such as a vector space.

The index data stored at search index 232 may be used to generate the training dataset 234 for training the multimodal embedding modifier 210. At a high level, data stored in the search index 232 can be in the form of audio, images, video, text, machine language, latent information, text embeddings, image embeddings, another form, or a combination thereof. In some embodiments, the training dataset 234 can comprise a combination of an image embedding and a text embedding.

The index data stored at search index 232 may include item listings and item listing data, such as item listing titles and item listing images from a plurality of item listings, for example. Continuing the example, one or more keywords may be identified for each item listing title or each item listing description. In some aspects, the NLP engine 212 is applied to one or more particular characters or one or more particular text strings of the item listing titles, and the image processing engine 214 is applied to one or more item listing images. In some embodiments, the NLP engine 212 and the image processing engine 214 are applied to one item listing simultaneously. In some aspects, one or more item listings are processed in near real-time (e.g., as an item listing is received). In some aspects, an item listing is processed in response to detecting a change to an item listing title, description, or image (e.g., a change to shipping information).

The index data stored at search index 232 may include item listing descriptions such as, for example, a particular identifier for the item (e.g., a batch number, a catalog number, a serial number, a part number), a brand, a seller identifier (e.g., a unique identifier associated with a particular seller), a quantity, a price, another item listing description, or a combination thereof. In some embodiments, the NLP engine 212 is applied to one or more particular text characters of the item listing description, one or more particular text strings of the item listing description, text characters or text strings that were previously converted from audio and video data, or a combination thereof. In some embodiments, the item listing descriptions are processed in real-time or in response to receiving a new item listing description, a new portion of the item listing description, or in response to detecting another type of change to the item listing description. In some embodiments, the search index 232 is updated in near-real-time through one or more platforms.

Additionally or alternatively, one or more image indexing applications may process images associated with item listings or images otherwise received from an entity (e.g., a third-party seller, a consumer, one or more online marketplaces, a manufacturer, a retailer, a collector, an item expert, a website, another entity, or the like, or a combination thereof) to generate index data for the images. As such, the index data stored at search index 232 may also include image data associated with item listings as well as image data associated with historical queries and historically used modifiers, for example. In some embodiments, an image crawler may be used to parse the image data within the search index 232. For example, the image crawler may continually locate and submit un-indexed images in the search index 232 and pass them to the search engine 208 for further indexing. In addition, the image index data stored at search index 232 may be used to generate the image dataset 238 of the training dataset 234 to train the image processing engine 214 of the multimodal embedding modifier 210.

The search index 232 can include a reverse index, a forward index, another type of index, or a combination thereof. For example, the search index 232 may include a combination of a forward index and reverse index. As another example, the search index 232 can include two level sharding, wherein one of the two levels includes business logic on client nodes. A reverse index may include, for example: algoid:key→list of listingIds+static scores, built offline with selection algorithms. As another example, a forward index may include: listingId→listing (seller-provided and model-derived) attributes for models and serving. In some embodiments, the index data is bulk loaded (e.g., via a connector) onto the search index 232. In some embodiments, search index 232 includes n-gram based and entity-based selection streams, wherein the search index 232 is keyed off n-grams or entities derived from item listings. In some embodiments, search index 232 leverages artificial intelligence name entity recognition for entity-based generation.

The NLP engine 212 may be trained to determine a text embedding. Additionally or alternatively, the image processing engine 214 may be trained to determine an image embedding. In some embodiments, the textual dataset 236, the image dataset 238, or a combination of both, is generated and stored at data store 230 based on a particular client or entity (e.g., a particular company or a particular department of the company). As such, the multimodal model 240 may be trained to determine an embedding specifically for the particular client or entity based on the training dataset 234 for that particular client or entity. For example, the particular client or entity may use a different nomenclature or may have an item listing structure or format that is different than another client or entity or another plurality of clients or entities. By training the multimodal embedding modifier 210 specific to one client or entity, the multimodal embedding modifier 210 would enhance the efficiency and accuracy of modifying seed search selection embeddings for that particular client or entity. Additionally or alternatively, one or more training datasets 234 may be generated for a particular geographical area (e.g., a state, a U.S. territory, a county, a particular country or province within that country, a particular city within a country, etc.).

In some embodiments, the training dataset 234 may be updated based on receiving additional item listings or based on storing new data corresponding to a new item listing, for example. In some embodiments, embeddings of the training dataset 234 are ordered based on the textual embedding. Stated differently, textual and image embedding pairs or groups corresponding to a particular item can be ordered based on the textual embedding, in some embodiments.

Continuing the example, the textual and image embedding pairs or groups corresponding to the particular item may also be ordered based on associations with other items and their corresponding textual and image embedding pairs or groups. In other embodiments, embeddings of the training dataset 234 may be ordered based on the image embedding, such that the textual and image embedding pairs or groups are ordered based on the image embeddings.

Accordingly, the multimodal model 240 may be employed by the NLP engine 212, the image processing engine 214, another engine, or a combination thereof; the multimodal model 240 being trained via the training dataset 234 to determine an embedding for the seed search selection 204 and the modifier 206, and to modify the seed search selection embedding via the modifier embedding. In the examples provided throughout this disclosure, training the NLP engine 212 or the image processing engine 214 may include aspects of fine tuning a pre-trained model, the multimodal model 240 comprising the pre-trained model. In some embodiments, the multimodal model 240 can include a neural network model (an algorithm or set of algorithms that implement one or more deep learning techniques that utilize a set of algorithms to model high-level abstractions in data) implemented by one or more computer programs on one or more computing devices in one or more locations. For example, the multimodal model 240 may comprise a convolutional neural network with an architecture derived via an Inception neural network or ResNet neural network. In some embodiments, the image processing engine 214 implements the ResNet neural network. In other embodiments, the image processing engine 214 implements a vision transformer. For example, implementation of the vision transformer may include operating on a bag-of-words representation of patches of an image, in some embodiments.

Additionally or alternatively, the multimodal model 240 may include bidirectional encoder representations from transformers (BERT). In an aspect, BERT is a pre-trained deep bidirectional representations from unlabeled text via joint conditioning on both left and right context in all layers. A pre-trained BERT model may be fine-tuned using one or more additional output layers. In some embodiments, BERT is pre-trained for sentence-level tasks, such as letter or word inferring or paraphrasing. In some embodiments, BERT predicts a relationship between or among item listing titles by analyzing the titles holistically. In some embodiments, BERT predicts a relationship between or among item listing descriptions (or portions thereof) by analyzing the descriptions (or portions thereof) holistically. In some embodiments, BERT predicts a relationship between or among item listing audio and/or video data that was converted into textual data. In some embodiments, BERT provides a fine-grained output at the token level for one or more item listing titles, for one or more item listing descriptions, for one or more item listing audio and/or video data, another type of item listing data, or a combination thereof. During pre-training, BERT may learn general language representations associated with particular item listing data.

In some embodiments, BERT is pre-trained and then fine-tuned. For example, during pre-training, BERT may be trained on a plain text corpus to identify context for a given word. Continuing the example, BERT may then be fine-tuned using the textual dataset 236 to determine a text embedding for a given set of characters or text string. In some embodiments, the pre-training and fine-tuning result in BERT is configured to receive an input token sequence comprising a text string or a plurality of text strings. In some embodiments, the input token sequence may be associated with a <text string, item aspect>token sequence, for example.

It will be understood that other natural language processing models and other image processing models may be used, including one or more models for generating text embeddings from items, item listings, item listing titles, and item listing descriptions, and such models are intended to be within the scope of the natural language processing models described herein. For instance, another suitable example is word2vec. Other examples of textual processing models include, but are not limited to, a convolutional neural network with an architecture that has multiple one-dimensional convolutional layers, a lookup based mapping from text to embedding, a sequence of fully-connected layers configured to process n-gram text tokens, a recurrent neural network model (e.g., an LSTM) that is configured to sequentially process representations of characters of the text, another type of textual processing model, or a combination thereof.

In one embodiment, the multimodal model 240 includes a ResNet neural network and BERT, the multimodal model 240 being trained on a training dataset 234 generated from a plurality of titles from a plurality of item listings. In one embodiment, the ResNet neural network generates or determines image embeddings. In another embodiment, the ResNet neural network and BERT together generate a text embedding (e.g., via embedding generator 216) or determine a text embedding. In yet another embodiment, the NLP engine 212 utilizes two of the last layers of BERT for generating a text embedding. Once trained, the multimodal model 240 generates, in some embodiments, text embeddings having a size of [1×128] and image embeddings having the size [1×128], wherein the text embeddings are associated with a title of an item listing. As such, by generating embeddings at this size (compared to embeddings having a size of [1×768]), the performance and predictive accuracy of the multimodal model 240 is enhanced compared to other models having larger embedding sizes. For example, the multimodal model 240 is capable of deployment on the search engine 208 without having high latency effects and by still meeting various thresholds without significant or meaningful loss on the performance of the search engine. As another example, image and text embeddings having a size of [1×64] may perform faster, but may have a lower predictive accuracy. Further, in some embodiments, the multimodal model 240 generates text, image, audio, and video embeddings, each having a size of [1×128].

Once trained, the multimodal embedding modifier 210 can modify a seed search selection embedding using a modifier embedding. In some embodiments, the seed search selection embedding corresponds to a textual embedding associated with a textual portion of an item listing and the modifier embedding corresponds to an image embedding. For example, the seed search selection 204 may include a selection of a textual portion of the item listing (e.g., a user who provided a search query for "lamp" may have selected "new" lamps within a portion of an item listing within a first set of search results provided in response to the query) and the modifier may include the selection of an image within the search results provided (e.g., the user then selects an image of a poster of a lamp).

In other embodiments, the seed search selection embedding corresponds to an image embedding and the modifier embedding corresponds to a text embedding. For example, the seed search selection 204 may include a selection of an image provided in response to a search query and the modifier may include a free-text modifier. As an illustrative example, a seed search selection of search results provided in response to a search query of "gum" may include the selection of an image of gumballs, and the modifier may include "1 inch" size gumballs. In yet another example, the seed search selection embedding may correspond to either an image embedding or a text embedding, and the modifier embedding can correspond to a plurality of text embeddings, a plurality of image embeddings, a combination of one or more text embeddings and one or more image embeddings, another type of embedding, or another combination thereof.

In one example implementation of the multimodal embedding modifier 210 of search engine 208, a user can find a matching furniture set comprising pieces from different sellers based on the multimodal embedding modifier 210 modifying one or more seed search selection embeddings using one or more modifier embeddings. For example, an initial search query may be for "living room furniture," and the seed search selection 204 can be from a first set of search results 242 generated by search result generator 218, the seed search selection 204 including the selection of an image of a sectional couch. Further, a positive modifier may include a particular color and material, and a negative modifier may include one or more different colors and materials. Having generated a seed search selection embedding for the image selected and a modifier embedding for each of the modifiers via the embedding generator 216, the search engine 208 provides a second set of search results 244 based on the multimodal embedding modifier 210 modifying the seed search selection embedding.

The multimodal embedding modifier 210 modifies the seed search selection embedding using each of the modifier embeddings. For example, the search engine 208 may receive a positive modifier and a negative modifier. The multimodal embedding modifier 210 can, in some embodiments, first add a keyword embedding associated with the positive modifier to the seed search selection embedding and subtract a keyword embedding associated with the negative modifier. In other embodiments, the multimodal embedding modifier 210 modifies the seed search selection embedding using a first modifier embedding, separately modifying the seed search selection embedding using a second modifier embedding, and finally aggregating both modified embeddings. Continuing this example, the modifications are aggregated upon a determination that a value of one or more of the modified embeddings is above a threshold.

Based on modifying the seed search selection embedding, a second set of search results 244 are provided. For example, the second set of search results 244 may include a nearest neighbor of the aggregated embedding. To do so, a k-nearest neighbors algorithm (k-NN) or Approximate Nearest Neighbors (ANN) can be used. As another example, the second set of search results 244 may include a nearest neighbor of a modified image embedding or a modified text embedding corresponding to the seed search selection. In yet another example, the second set of search results 244 may include a plurality of nearest neighbors within a threshold distance of the modified seed search selection embedding. Accordingly, based on the second set of search results 244, the user may purchase the furniture set comprising pieces from different sellers.

In another example implementation of the multimodal embedding modifier 210 of search engine 208, a user may select a seed item or otherwise provide an indication of a selection of a seed item. The search engine 208 determines or identifies an image embedding and a text embedding, generated by embedding generator 216, for the selected seed item. The search engine 208, in some embodiments, can implement the multimodal model 240 to aggregate the image embedding and text embedding for the seed item selected, the multimodal model 240 being trained on a training dataset 234 comprising aggregated text and image embeddings for item listings. Further, the search engine 208 can identify one or more nearest neighbors corresponding to the image embedding for the seed item, the text embedding for the seed item, the aggregated image and text embedding for the seed item, another generated or modified embedding for the seed item, or a combination thereof.

Additionally or alternatively, the search engine 208 can receive one or more modifiers, such as a positive modifier and a negative modifier, for instance. Based on the one or more modifiers received, embedding generator 216 can generate a modifier embedding for each modifier received. In some embodiments, the modifier embedding corresponds to a set of qualities to be removed from the seed search selection embedding, and in other embodiments, the modifier embedding corresponds to a set of qualities to be added. In some embodiments, the modifier embedding is applied to the title embedding of the seed item. The multimodal model 240 may comprise, for example, a contrastive language-image pre-training neural network trained on a plurality of image-text pairs. As such, the search engine 208 can provide the second set of search results 244 based on implementing the contrastive language-image pre-training neural network to modify the seed search selection embedding that corresponds to the title of the seed item, wherein the modification to the embedding is based on: the set of qualities to be removed from seed search selection embedding, the set of qualities to be added, or a combination thereof. In other embodiments, the search engine 208 can provide the second set of search results 244 based on implementing one or more tree search algorithms (e.g., a depth-first search algorithm).

Figure 3:
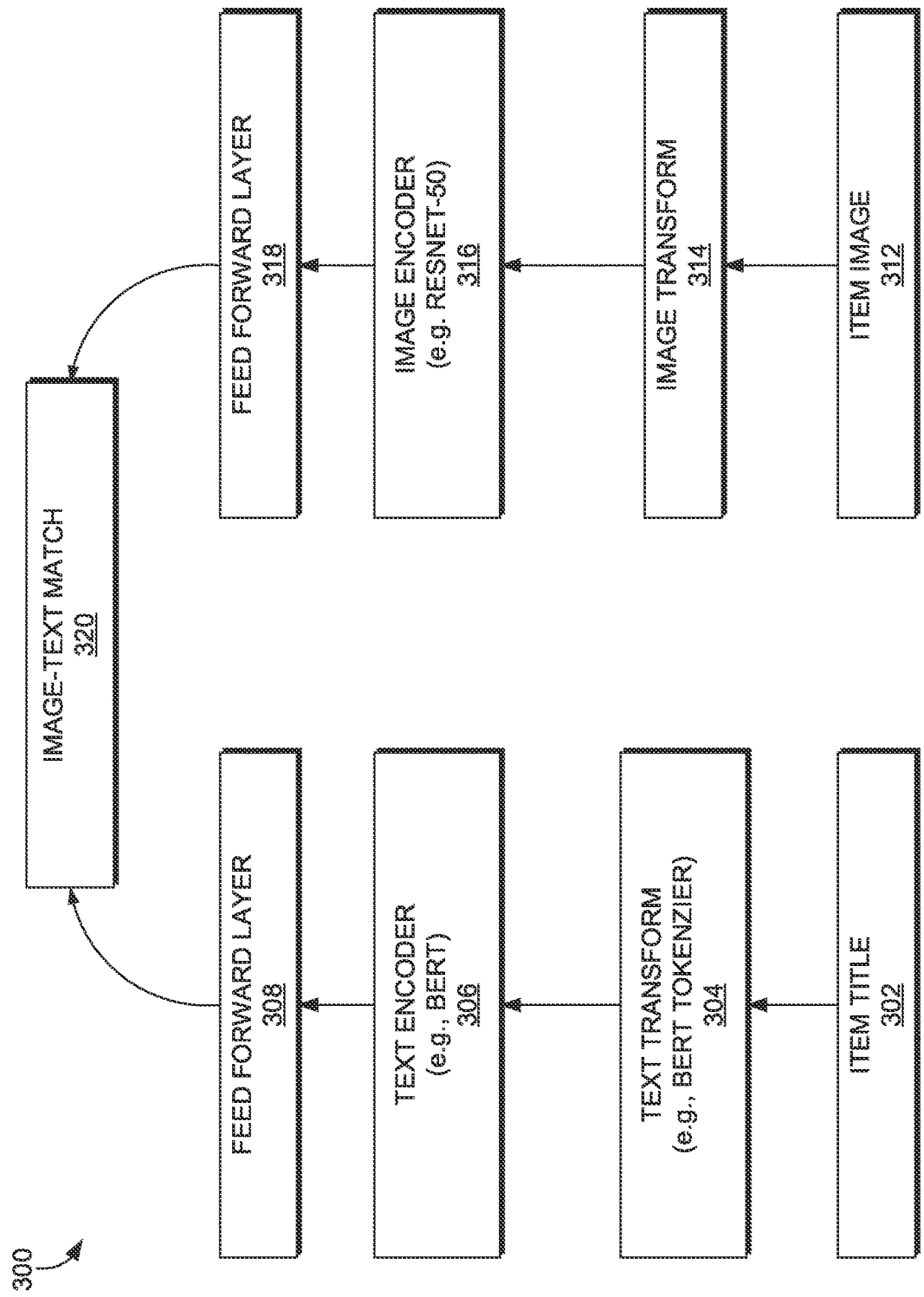
FIG. 3 includes an example flow diagram for training the multimodal embedding modifier to minimize matching loss between a text and image of the same item, in accordance with an embodiment described herein.

FIG. 3 illustrates an example flow diagram 300 for training the multimodal embedding modifier to minimize matching loss between a text and image of the same item. At 302, the text of the title of an item, or a portion of the title, is identified for transformation at 304 via a tokenizer, such as a tokenizer used by BERT, for example. In some embodiments, NLP engine 212 of FIG. 2 is trained to identify text of the title or a portion of the title, as well as text of the item listing description.

In addition, the tokenizer may tag, partition, or tag each partition of the natural language input of the title or portion of the title. Once tokenized, the title or the portion of the title may be processed by a machine learning model, such as BERT for example, to identify relevant content related to the item. The tokenizer may also tag, partition, or tag each partition of a natural language input of the item listing description of the item to identify relevant content related to the item. As an example, the tokenizer may identify a plurality of portions of text within the item listing descriptions, the plurality of portions each related to an aspect of the item, such as color, material, or shipping data, for example.

Based on the tokenization at 304, the tokenized content is encoded by an encoder at 306, such as BERT for example. The encoder at 306 can generate an embedding associated with each tag or each partition. Examples of encoders other than BERT include, but are not limited to, Sent2Vec, embeddings from language models, and recurrent neural networks. In some embodiments, embeddings for an item associated with the title, embeddings associated with the item description, or embeddings associated with the title and the description may be aggregated via neural network, such as, for example, a gated recurrent unit neural network, a bidirectional gated recurrent unit neural network, a long short-term memory neural network, or an attention-based aggregation method.

Based on the encoding at 306, the embedding is processed by a feed forward layer at 308. In some embodiments, the feed forward layer may include one or more feed forward layers (e.g., one or more fully-connected pre-processing layers) of a neural network. In some embodiments, a first feed forward layer uses neurons to extract one or more features of an embedding and provides the output to a second feed forward layer. Continuing the example, the features extracted by the neurons of the second layer may be used for determining one or more aspects associated with the item, such as aspects that correspond with one or more images of the item.

Additionally, an image of the item 312 may be transformed at 314 in preparation for image encoding at 316. In some embodiments, the transformation at 314 may include applying transformer architecture with self-attestation to sequences of image patches (e.g., patches having a fixed size and patches that are non-overlapping), for instance. The self-attestation, in some embodiments, can include accepting input encodings associated with the image and weighting their relevance to each other to generate output encodings for identifying the particular patches to transform.

Based on the image transform at 314, an encoder (e.g., an encoder comprising encoding layers that process an input one layer after another) may processes the transformed image at 316. In some embodiments, the encoder is a convolutional neural network, such as ResNet-50 having fifty layers. In some aspects, the ResNet-50 is pre-trained on ImageNet. In some aspects, a reinforcement learning technique prunes a greater number of activation weights for earlier layers of the ResNet-50 than the later layers of the ResNet-50. In other aspects, the later layers of the ResNet-50 have the greater number of pruned activation weights. In some embodiments, the ResNet-50 is trained based on a hardware configuration of the hardware platform on which the ResNet-50 is to be executed. In some embodiments, a transformer model may encode the image at 316. In some embodiments, the transformer model can receive image data for an item sequentially, for example. In one embodiment, the image of an item may be encoded at 316 via a vision transformer.

At 318, a feed-forward layer processes the embedding generated at 316. For example, a feed-forward neural network may further process each output from the encoder at 316 individually. The feed-forward layer can be a multilayer perceptron, in some embodiments. Furthermore, at 320, the output from the feed-forward layer at 308 and the output from the feed-forward layer at 318 are matched for each item, such that one or more matchings generated at 320 are used to generate a training dataset (e.g., training dataset 234 of FIG. 2) for training the multimodal model (e.g., multimodal model 240 of FIG. 2).

For example, by training the multimodal model using the training dataset generated at 320, the trained multimodal model can modify an image embedding using a modifier embedding corresponding to a textual modifier, an image modifier, another type of modifier, or a combination thereof. As another example, the trained multimodal model can modify a textual embedding using a modifier embedding corresponding to a textual modifier, an image modifier, another type of modifier, or a combination thereof. As such, the trained multimodal model can minimize matching loss between a text and image of the same item.

Figure 4:
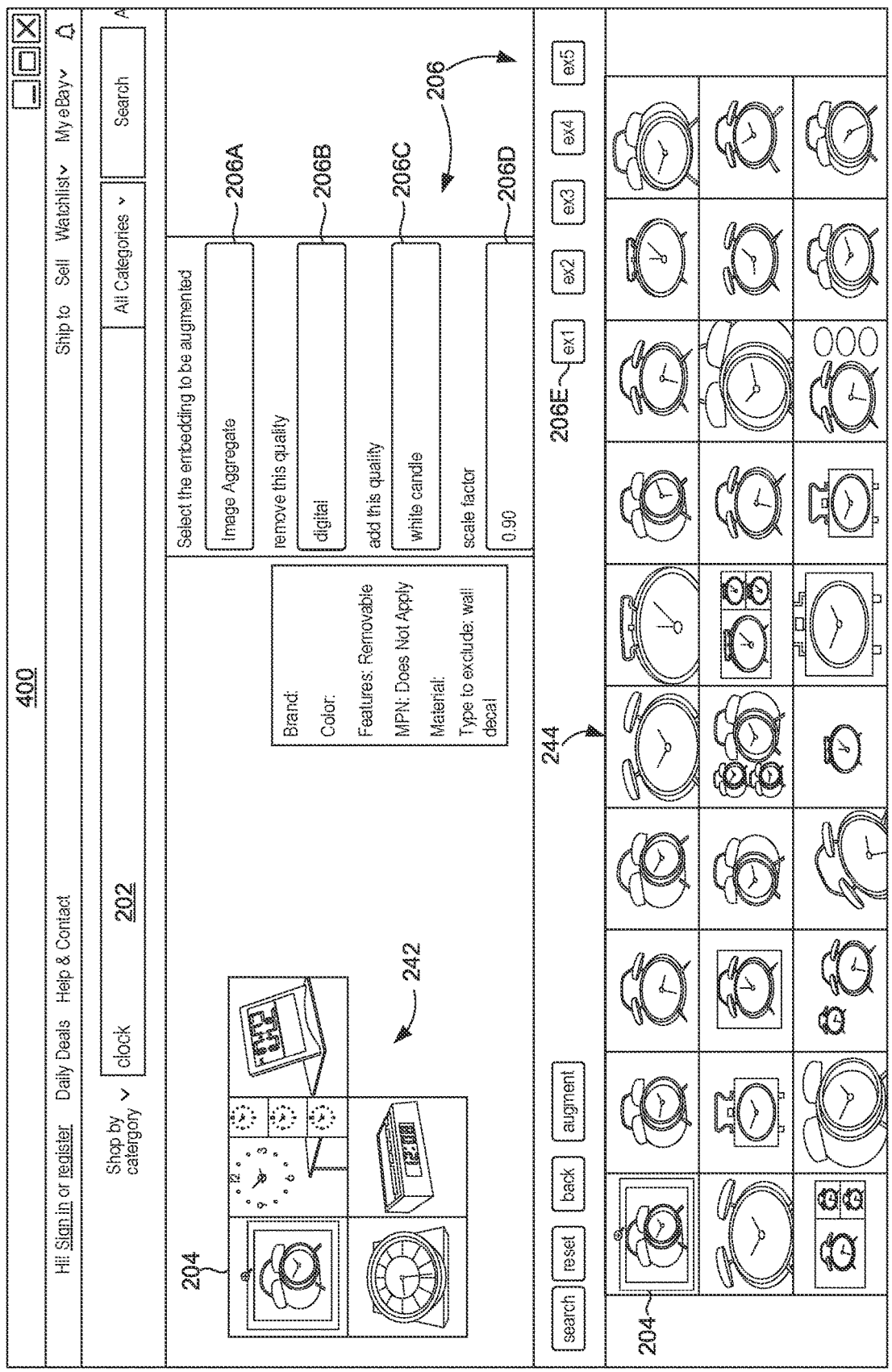
FIG. 4 illustrates an example user interface environment for receiving search results based on a modified seed embedding, in accordance with an embodiment described herein.

FIG. 4 depicts an example user interface environment 400 for receiving or providing search results based on a modified seed search selection embedding. For example, example environment 400 includes search query 202, a first set of search results 242, a seed search selection 204 from the first set of search results provided by the search engine (e.g. search engine 208 of FIG. 2), one or more modifiers 206 (e.g., including example modifiers 206A-206E), and a second set of search results 244. The second set of search results 244, in this example embodiments, includes the seed search selection 204. In other embodiments, the second set of search results 244 may not include the seed search selection 204. The second set of search results 244 can be provided based on modifying an embedding of the seed search selection 204 using a modifier embedding of the one or more modifiers 206.

For example, modifier 206A may include an embedding to be augmented. The modifier 206A may include a dropdown section including a predetermined list of embeddings to augment (e.g., an image aggregate, a text aggregate, an image-text aggregate, another type of aggregate, or a combination thereof). In other embodiments, a user may freely type text into one or more of the modifiers 206A-206D. In addition, a negative modifier 206B may be provided. The negative modifier in example environment 400 includes "digital" clocks. In some embodiments, two or more negative modifiers may be included. Another negative modifier, such as types of clocks to exclude or other clock aspects to exclude, in example environment 400 may be the exclusion of wall decal clocks. Furthermore, a positive modifier 206C may be provided. The positive modifier in example environment 400 includes "white candle" color being included in the clocks.

In some embodiments, one or more of the modifiers selected may be weighted differently. For instance, a user may type in at modifier 206D a weighted factor to attribute to the negative modifier 206B or a weighted factor to attribute to the positive modifier 206C. In other embodiments, the user may select at 206E a weighted factor to apply to each of the one or more modifiers 206. In one example embodiment, the positive modifier 206C may have a scale factor of 0.90 and the negative modifier 206B may have a scale factor of 0.50, for instance. An embedding for each modifier or for an aggregation of all the modifiers may be generated, and the embedding may be associated with each scale factor attributed to each of the modifiers. In some embodiments, the search engine may aggregate particular quality identifiers multiple times across a plurality of dimensions.

Figure 5:
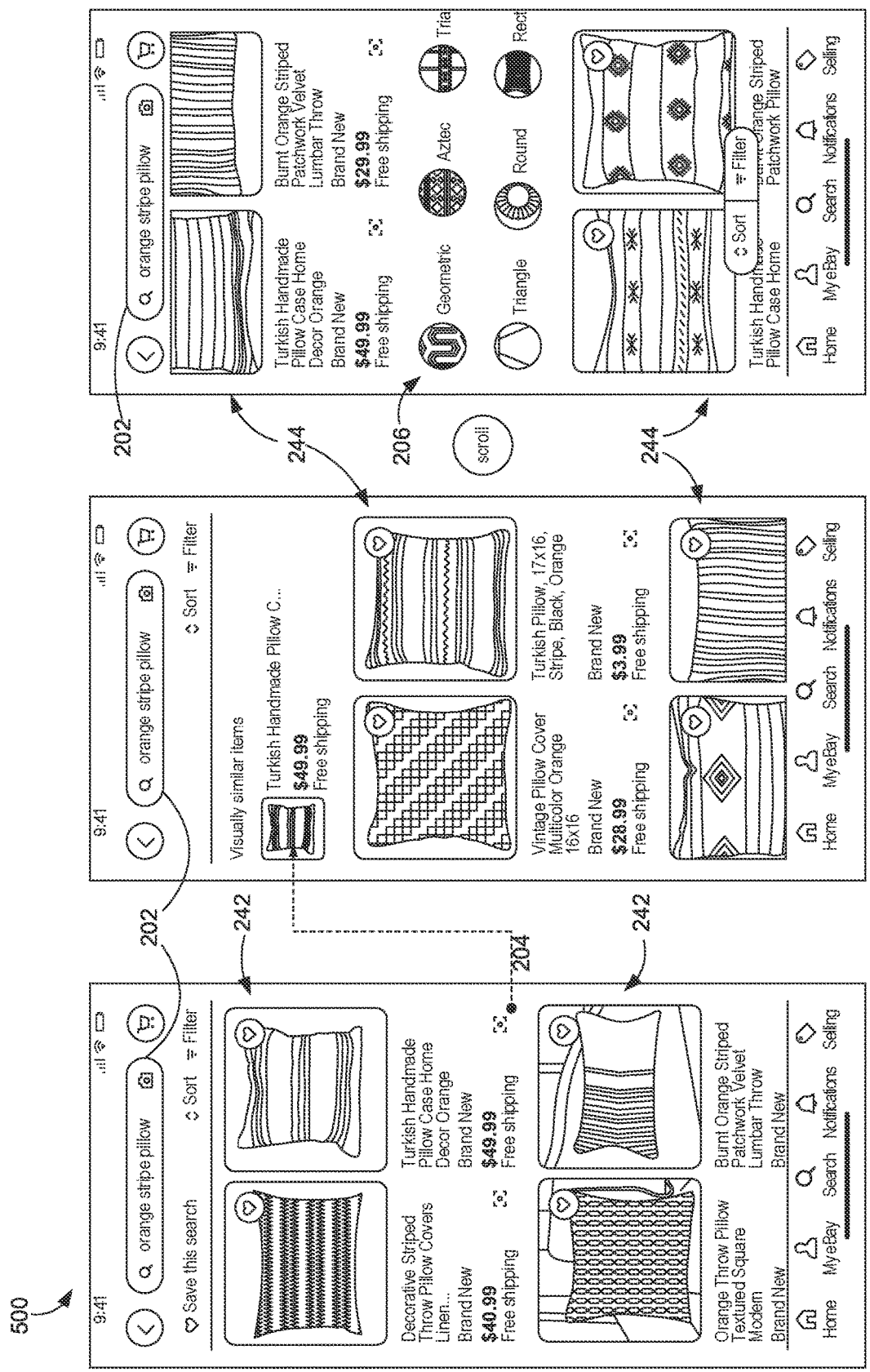
FIG. 5 illustrates another an example environment for receiving search results based on a modified seed embedding, in accordance with an embodiment described herein.

FIG. 5 depicts another example user interface environment 500 for receiving or providing search results based on a modified seed search selection embedding. For example, example environment 500 includes search query 202, a first set of search results 242, a seed search selection 204, modifiers 206, and a second set of search results 244. In example environment 500, the search query 202 is a textual search query for "orange stripe pillow." In some embodiments, "orange stripe pillow" is automatically queried in response to detecting an audio input.

Based on receiving the search query 202 at a search engine, the search engine provides the first set of search results 242. In example environment 500, the first set of search results 242 provided, on a graphical user interface, include an image and an item description (e.g., for a decorative striped throw pillow cover that is made of linen) for each item. The item description for the decorative striped throw pillow cover includes a price of the item, a price for the shipping of the item, and a description that the item is new. Additionally, an item image and item description are included for the other search results of the first set of search results 242: a Turkish handmade pillow case, an orange throw pillow, and a burnt orange striped throw pillow.

As depicted in example environment 500, seed 204 is selected (e.g., by a user). Based on the selection of the seed 204, the second set of search results 244 are provided on the graphical user interface. The second set of search results 244 are visually similar to the Turkish handmade pillow case from the first set of search results 242 that was selected as the seed search selection 204. The second set of search results 244 can be determined using an embedding of the seed search selection 204, for example. In some embodiments, the embedding of the seed search selection 204 can be modified based on one or more of the modifiers 206. In example environment 500, the modifiers 206 include a geometric pattern, an Aztec pattern, a tribal pattern, a triangular pattern, a round pattern, or a rectangular pattern.

The second set of search results 244 of example environment 500 include an image and an item description for the items that are visually similar to the seed search selection 204. Although the first set of search results 242 and the second set of search results of example environment 500 only depict one image on the graphical user interface, other embodiments are contemplated (e.g., two or more images depicted for each item on the graphical user interface). In some embodiments, a plurality of images for each item can be viewed by touching or swiping on the representative image provided for each item. The second set of search results 244 in example environment 500 includes a plurality of Turkish pillow case patterns, a vintage pillow cover with multicolor orange, and burnt orange striped search results.

Figure 6:
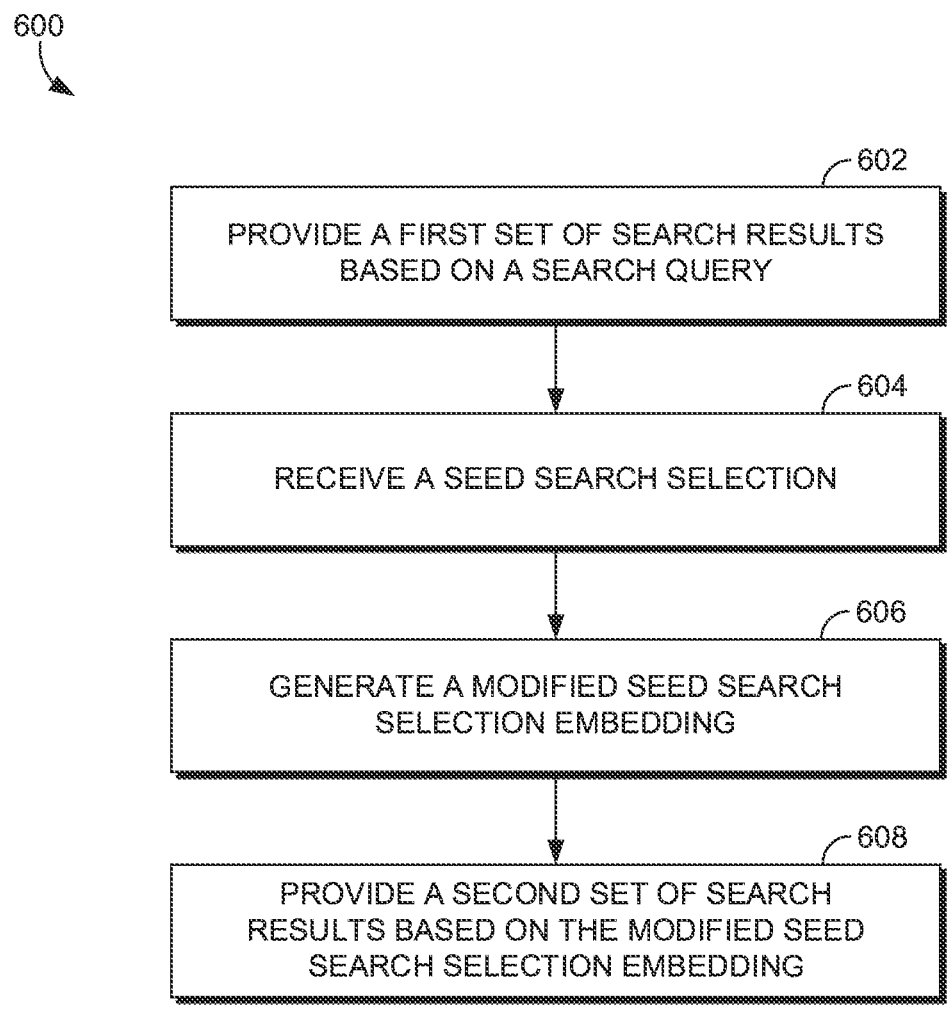
FIG. 6 is an example flowchart illustrating an example method for providing search results based on modifying a seed search selection embedding, in accordance with an embodiment described herein.

FIG. 6 depicts example flowchart 600. At 602, a first set of search results are provided based on receiving a search query, or a partial search query (e.g., receiving a portion of a complete word or a portion of a phrase) for example. Additionally, at 604, a seed search selection is received, the seed search selection corresponding to the first set of search results. For example, the selection of the seed search may include selection of an image, selection of one or more images for one item, selection of one or more images for more than one item, selection of an item listing, selection of one or more item listings for one item, selection of item listings for a plurality of items, a selection of a portion of an item listing, or a selection of portions of item listings for a plurality of items. In embodiments wherein the seed search selection comprises a selection of a plurality of search results from the first set of search results, the seed search selection embedding may be determined from the embeddings of the plurality of search results.

In some embodiments, an embedding for the seed search selection is identified, determined, or generated. For example, the seed search selection embedding may be generated via the embedding generator 216 of search engine 208 in FIG. 2. In some embodiments, the seed search selection embedding may include a text embedding from a textual element of the seed search selection, an image embedding from an image of the seed search selection, or a combination thereof. As one example, in some aspects, the seed search selection embedding can be generated from a title or a portion of the title of the seed search selection. As another example, the seed search selection embedding can be generated from both the title and a particular portion of the item listing description associated with the title. In yet another example, the embedding of the seed search selection can include an image embedding from an image element of the seed search selection or an image embedding from a plurality of image elements of the seed search selection.

At 606, the seed search selection embedding is modified, for example, by applying a modifier embedding to the seed search selection embedding. The seed search selection embedding can be modified using a modifier embedding, the modifier embedding being generated based on a modifier received for modifying the first set of search results provided. For example, the modifier may include a natural language input (e.g., similar to typing in a search query). In some embodiments, the modifier is a textual modifier, an image modifier, another type of modifier, or a combination thereof.

In some embodiments, the seed search selection embedding is separately modified based on textual embeddings and image embeddings using the modifier embedding. For example, for a seed search selection embedding comprising both a textual embedding and an image embedding, the textual embedding and the image embedding may be separately modified (e.g., the textual embedding is modified first). As another example, in some embodiments, the textual and image embeddings may be simultaneously modified. In yet another example, in some embodiments, the textual and image embeddings are aggregated prior to the modification via the modifier embedding.

In some embodiments, the modifier embedding is associated with a positive modifier, a negative modifier, another type of modifier, or a combination thereof. For example, in embodiments wherein the modifier comprises a negative modifier, modifying the seed search selection may comprise removing the modifier embedding from the seed search selection embedding. As another example, in embodiments wherein the modifier comprises a positive modifier, modifying the seed search selection may comprise adding the modifier embedding to the seed search selection embedding. In yet another example, modifying the seed search selection embedding may comprise combining at least a portion of the seed search selection embedding and positive modifier embedding and subsequently removing the negative modifier. In yet another example, modifying the seed search selection embedding may comprise removing the negative modifier and subsequently adding the positive modifier embedding.

Figure 8:
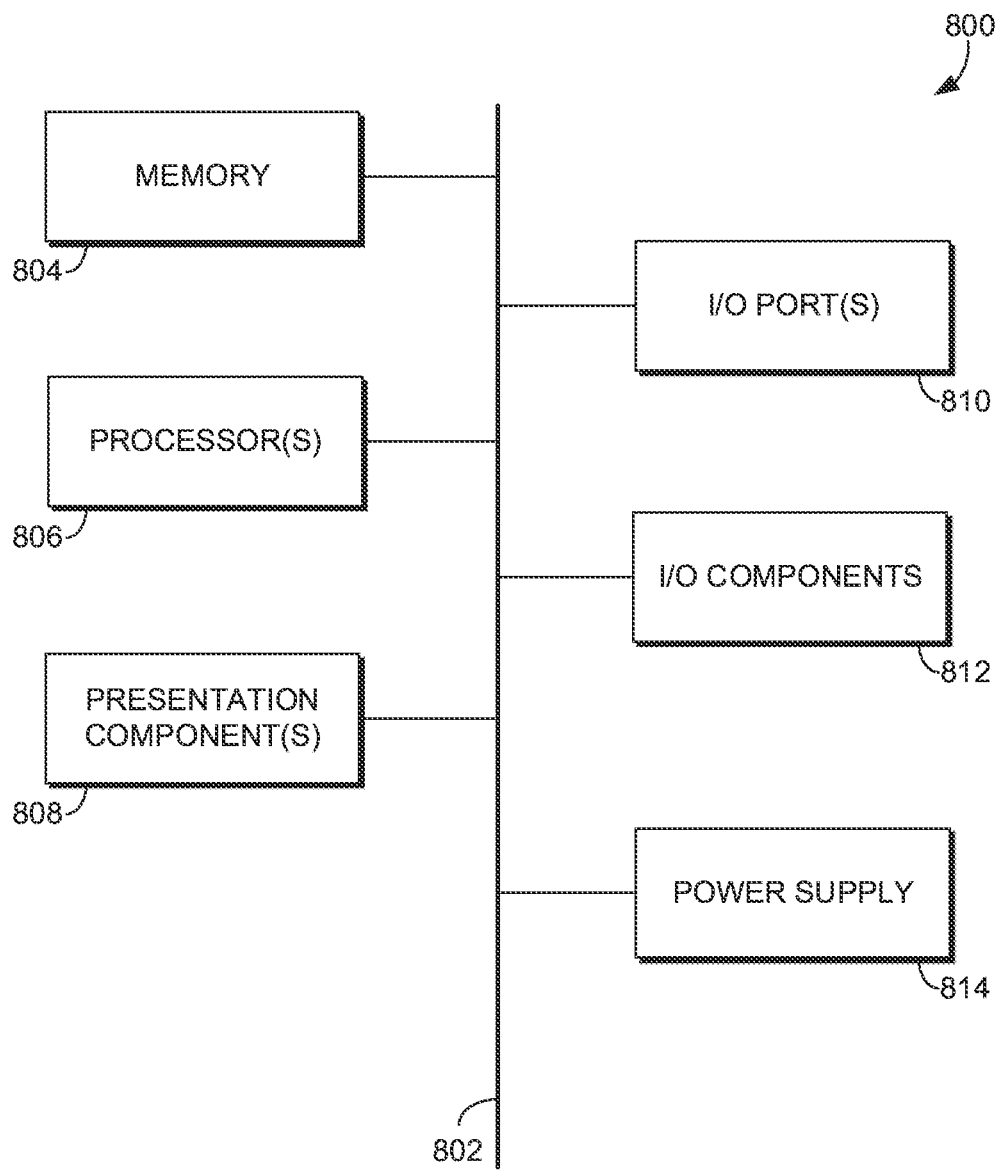
FIG. 8 is an example computing device suitable for implementing the described technology, in accordance with an embodiment described herein.

Further, a second set of search results are provided at 608 (e.g., via a graphical user interface display on a user device, such as user device 800 of FIG. 8 for instance) based on the modified seed search selection embedding. In some embodiments, the second set of search results can include one or more search results from the first set of search results and a plurality of search results not included in the first set of search results. The second set of search results, in some embodiments, can be provided based on distances between the modified seed search selection embedding and image embeddings, text embeddings, other types of embeddings, aggregated image-text embeddings, or other combinations thereof. In some embodiments, each of the embeddings were generated by the multimodal model 240 of FIG. 2. The second set of search results can correspond to item listings, item listing images, item listing descriptions, or a combination thereof. In some embodiments, the image and text embeddings correspond to item listings.

Figure 7:
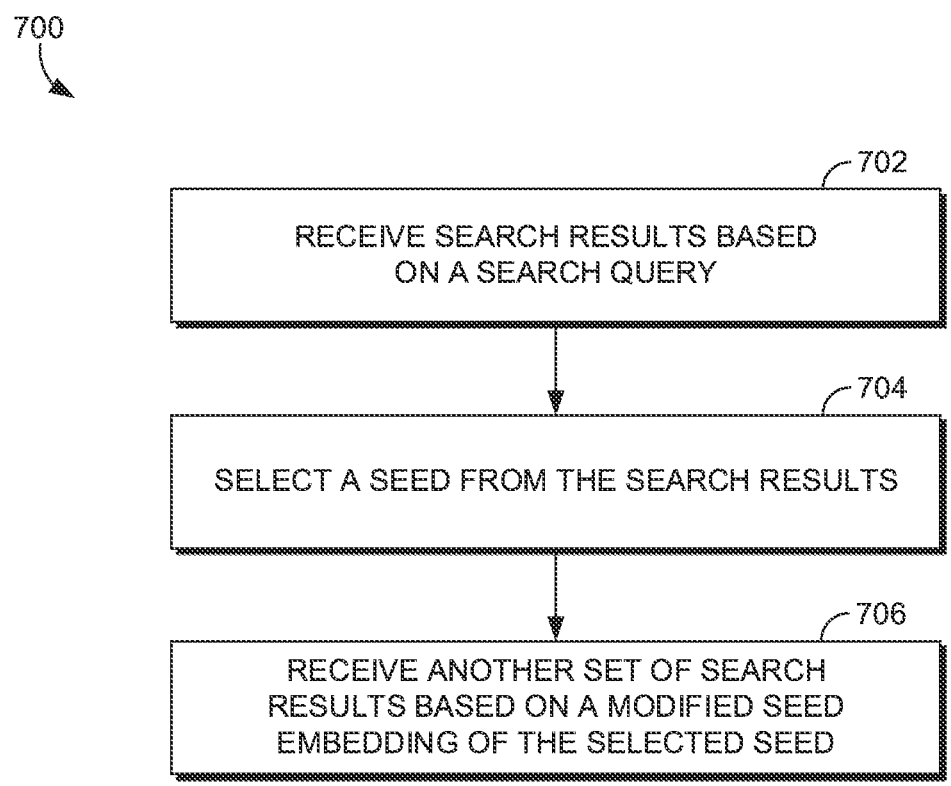
FIG. 7 is another example flowchart illustrating an example method for receiving search results based on a modified seed embedding, in accordance with an embodiment described herein.

FIG. 7 depicts example flowchart 700 from a user's perspective. At 702, a user may receive, at a graphical user interface display for example, a first set of search results based on providing a search query. The search results may include item listings for items that each include one or more of an item listing description, a title, and an image. Based on receiving the first set of search results, the user may select (e.g., on the graphical user interface) a seed from the first set of search results at 704 for the generation of a seed embedding (e.g., generated by embedding generator 216 of FIG. 2). As one example, selecting the seed may include the selection of an image of the first set of search results received. As another example, selecting the seed may include selecting an item listing or selecting a textual portion of the item listing.

At 706, another set of search results are received based on a modification to the seed embedding (e.g., generated by embedding generator 216 of FIG. 2) of the selected seed. For example, the seed embedding may be modified using vector arithmetic according to a modifier embedding (e.g., generated by embedding generator 216 of FIG. 2). For example, the user may provide a modifier in addition to selecting the seed. The modifiers may be the modifiers described above with respect to FIGS. 4-5, for example. In some embodiments, the modifier can include a positive modifier and a negative modifier, and modifying the seed embedding can include combining at least a portion of the seed embedding and a positive modifier embedding corresponding to the positive modifier, and removing a negative modifier embedding corresponding to the negative modifier from the seed embedding.

In embodiments wherein the seed selection includes selecting an image of the search results, the modifier embedding may be generated for the image selected via a multimodal model trained to generate image and text embeddings. In some aspects, the multimodal model comprises bidirectional encoder representations from transformers (BERT). In some aspects, the multimodal model also comprises a ResNet in addition to BERT. In other aspects, the image embedding may be generated at least in part based on a vision transformer. In some aspects, the multimodal model is trained, at least in part, using a plurality of titles from a plurality of item listings. Furthermore, selecting the seed, in some embodiments, may comprise selecting a plurality of the search results. Continuing this example, the seed embedding may be determined from selecting the plurality of search results.

Having described an overview of embodiments of the present technology, an example operating environment in which embodiments of the present technology may be implemented is described below in order to provide a general context for various aspects. Referring initially to FIG. 8, in particular, an example operating environment for implementing embodiments of the present technology is shown and designated generally as computing device 800. Computing device 800 is but one example of a suitable computing environment and is not intended to suggest any limitation as to the scope of use or functionality of the technology. Neither should computing device 800 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 8, computing device 800 includes bus 802 that directly or indirectly couples the following devices: memory 804, one or more processors 806, one or more presentation components 808, input/output ports 810, input/output components 812, and illustrative power supply 814. Bus 802 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component, such as a display device, to be an I/O component. As another example, processors may also have memory. Such is the nature of the art, and it is again reiterated that the diagram of FIG. 8 is merely illustrates an example computing device that can be used in connection with one or more embodiments of the present technology. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media.

Computer storage media include volatile and nonvolatile, removable and non-removable media implemented in any method or technology for storage of information, such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 804 includes computer storage media in the form of volatile or nonvolatile memory. The memory 804 may be removable, non-removable, or a combination thereof. Example hardware devices include solid-state memory, hard drives, optical-disc drives, etc. Computing device 800 includes one or more processors that read data from various entities such as memory 804 or I/O components 812. Presentation component(s) 808 present data indications to a user or other device. Examples of presentation components include a display device, speaker, printing component, vibrating component, etc.

I/O ports 810 allow computing device 800 to be logically coupled to other devices including I/O components 812, some of which may be built in. Illustrative components include a microphone, joystick, game pad, satellite dish, scanner, printer, wireless device, and so forth.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" or "having" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media.

In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

For purposes of a detailed discussion above, embodiments of the present technology described with reference to a distributed computing environment; however, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to the distributed data object management system and the described schematics, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

Some example aspects of the technology that may be practiced from the forgoing disclosure include the following:

Aspect 1: A computer-implemented method comprising: providing a first set of search results based on a search query; receiving a seed search selection selected from the first set of search results provided; receiving a modifier; determining a modifier embedding for the modifier; generating a modified seed search selection embedding by modifying a seed search selection embedding of the seed search selection using the modifier embedding; and providing a second set of search results based on the modified seed search selection embedding.

Aspect 2: Aspect 1, wherein the modifier is a natural language input.

Aspect 3: Aspect 1 or 2, wherein the seed search selection comprises a plurality of search results from the first set of search results, and wherein the seed search selection embedding is determined from search result embeddings of the plurality of search results.

Aspect 4: Aspect 1, 2, or 3, wherein the seed search selection embedding comprises a text embedding from a textual element of the seed search selection and an image embedding from an image of the seed search selection.

Aspect 5: Aspect 1, 2, 3, or 4, wherein the modified seed search selection embedding is generated by separately modifying the text embedding and the image embedding using the modifier embedding.

Aspect 6: Aspect 1, 2, 3, 4, or 5, wherein the seed search selection embedding is generated from a title of the seed search selection.

Aspect 7: Aspect 1, 2, 3, 4, 5, or 6, wherein the modifier comprises a negative modifier, and wherein modifying the seed search selection embedding comprises removing the modifier embedding from the seed search selection embedding.

Aspect 8: Aspect 1, 2, 3, 4, 5, 6, or 7, wherein the modifier comprises a positive modifier, and wherein modifying the seed search selection embedding comprises combining the seed search selection embedding and the modifier embedding.

Aspect 9: A computer system comprising: a processor; and a computer storage medium storing computer-useable instructions that, when used by the processor, causes the computer system to perform operations comprising: receive a first set of search results based on a search query; select a seed from the first set of search results for the generation of a seed embedding; provide a modifier; and receive a second set of search results based on a modified seed embedding of the selected seed, wherein the seed embedding of the selected seed is modified via a modifier embedding corresponding to the modifier provided.

Aspect 10: Aspect 9, wherein the modifier includes a positive modifier and a negative modifier, and wherein modifying the seed embedding includes: combine at least a portion of the seed embedding and a positive modifier embedding corresponding to the positive modifier; and remove a negative modifier embedding corresponding to the negative modifier from the seed embedding.

Aspect 11: Aspect 9 or 10, wherein selecting the seed includes selecting an image of the first set of search results received.

Aspect 12: Aspect 9, 10, or 11, wherein the modifier embedding is generated for the image selected via a multi-modal model trained to generate image and text embeddings, the multimodal model comprising bidirectional encoder representations from transformers (BERT).

Aspect 13: Aspect 9, 10, 11, or 12, wherein the multimodal model is trained, at least in part, using a plurality of titles from a plurality of item listings.

Aspect 14: Aspect 9, 10, 11, 12, or 13, further comprising select a plurality of search results from the first set of search results as the seed, wherein the seed embedding is determined from the plurality of search results selected from the first set of search results.

Aspect 15: One or more computer storage media storing computer-useable instructions that, when used by a computing device, cause the computing device to perform operations, the operations comprising: receiving a seed search selection selected from a first set of search results provided via a user interface, the first set of search results based on a search query; receiving a modifier for modifying search results for the search query based on the seed search selection; generating a modifier embedding for the modifier; generating a modified seed search selection embedding for the seed search selection by applying the modifier embedding to an embedding of the seed search selection; and providing a second set of search results based on the modified seed search selection embedding.

Aspect 16: Aspect 15, wherein the second set of search results includes a plurality of search results from the first set of search results and a plurality of search results not included in the first set of search results.

Aspect 17: Aspect 15 or 16, wherein the embedding of the seed search selection includes an image embedding from an image element of the seed search selection.

Aspect 18: Aspect 15, 16, or 17, wherein the modified seed search selection embedding is generated by modifying the image embedding using the modifier embedding, the modifier embedding corresponding to a textual modifier.

Aspect 19: Aspect 15, 16, 17, or 18, wherein the modifier embedding is generated via a multimodal model trained to generate image and text embeddings, the multimodal model comprising bidirectional encoder representations from transformers.

Aspect 20: Aspect 15, 16, 17, 18, or 19, wherein the second set of search results are provided based on distances between the modified seed search selection embedding and the image and text embeddings generated by the multimodal model, the image and text embeddings corresponding to item listings.

What is claimed is:

1. A computer-implemented method comprising:
providing a first set of search results based on a search query;
receiving a seed search selection selected from the first set of search results provided;
receiving a modifier;
determining a modifier embedding for the modifier, wherein the modifier embedding is generated for the seed search selection via a multimodal model trained to generate image and text embeddings, the multimodal model comprising bidirectional encoder representations from transformers (BERT);
generating a modified seed search selection embedding by modifying a seed search selection embedding of the seed search selection using the modifier embedding; and
providing a second set of search results based on the modified seed search selection embedding.

2. The computer-implemented method of claim 1, wherein the modifier is a natural language input.

3. The computer-implemented method of claim 1, wherein the seed search selection comprises a plurality of search results from the first set of search results, and wherein the seed search selection embedding is determined from search result embeddings of the plurality of search results.

4. The computer-implemented method of claim 1, wherein the seed search selection embedding comprises a text embedding from a textual element of the seed search selection and an image embedding from an image of the seed search selection.

5. The computer-implemented method of claim 4, wherein the modified seed search selection embedding is generated by separately modifying the text embedding and the image embedding using the modifier embedding.

6. The computer-implemented method of claim 1, wherein the seed search selection embedding is generated from a title of the seed search selection.

7. The computer-implemented method of claim 1, wherein the modifier comprises a negative modifier, and wherein modifying the seed search selection embedding comprises removing the modifier embedding from the seed search selection embedding.

8. The computer-implemented method of claim 1, wherein the modifier comprises a positive modifier, and wherein modifying the seed search selection embedding comprises combining the seed search selection embedding and the modifier embedding.

9. A computer system comprising:
a processor; and
a computer storage medium storing computer-useable instructions that, when used by the processor, causes the computer system to perform operations comprising:
receive a first set of search results based on a search query;
select a seed from the first set of search results for the generation of a seed embedding;
provide a modifier; and
receive a second set of search results based on a modified seed embedding of the selected seed, wherein the seed embedding of the selected seed is modified via a modifier embedding corresponding to the modifier provided, wherein the modifier embedding is generated for the seed selected via a multimodal model trained to generate image and text embeddings, the multimodal model comprising bidirectional encoder representations from transformers (BERT).

10. The computer system of claim 9, wherein the modifier includes a positive modifier and a negative modifier, and wherein modifying the seed embedding includes:
combine at least a portion of the seed embedding and a positive modifier embedding corresponding to the positive modifier; and
remove a negative modifier embedding corresponding to the negative modifier from the seed embedding.

11. The computer system of claim 9, wherein selecting the seed includes selecting an image of the first set of search results received.

12. The computer system of claim 9, wherein the multimodal model is trained, at least in part, using a plurality of titles from a plurality of item listings.

13. The computer system of claim 9, further comprising select a plurality of search results from the first set of search results as the seed, wherein the seed embedding is determined from the plurality of search results selected from the first set of search results.

14. One or more computer storage media storing computer-useable instructions that, when used by a computing device, cause the computing device to perform operations, the operations comprising:
- receiving a seed search selection selected from a first set of search results provided via a user interface, the first set of search results based on a search query;
- receiving a modifier for modifying search results for the search query based on the seed search selection;
- generating, via a multimodal model trained to generate image and text embeddings, a modifier embedding for the modifier, wherein the multimodal model comprises bidirectional encoder representations from transformers;
- generating a modified seed search selection embedding for the seed search selection by applying the modifier embedding to an embedding of the seed search selection; and
- providing a second set of search results based on the modified seed search selection embedding.

15. The one or more computer storage media of claim 14, wherein the second set of search results includes a plurality of search results from the first set of search results and a plurality of search results not included in the first set of search results.

16. The one or more computer storage media of claim 14, wherein the embedding of the seed search selection includes an image embedding from an image element of the seed search selection.

17. The one or more computer storage media of claim 16, wherein the modified seed search selection embedding is generated by modifying the image embedding using the modifier embedding, the modifier embedding corresponding to a textual modifier.

18. The one or more computer storage media of claim 14, wherein the second set of search results are provided based on distances between the modified seed search selection embedding and the image and text embeddings generated by the multimodal model, the image and text embeddings corresponding to item listings.

19. The one or more computer storage media of claim 14, the operations further comprising generating the modifier embedding based on applying the multimodal model to a plurality of titles from a plurality of item listings to generate the text embeddings.

20. The one or more computer storage media of claim 14, wherein the modifier includes an image-text aggregate.

* * * * *